Dec. 30, 1969 W. MUELLER 3,486,258
MOVABLE DISPLAY ARRANGEMENT
Filed Dec. 6, 1967 6 Sheets-Sheet 1
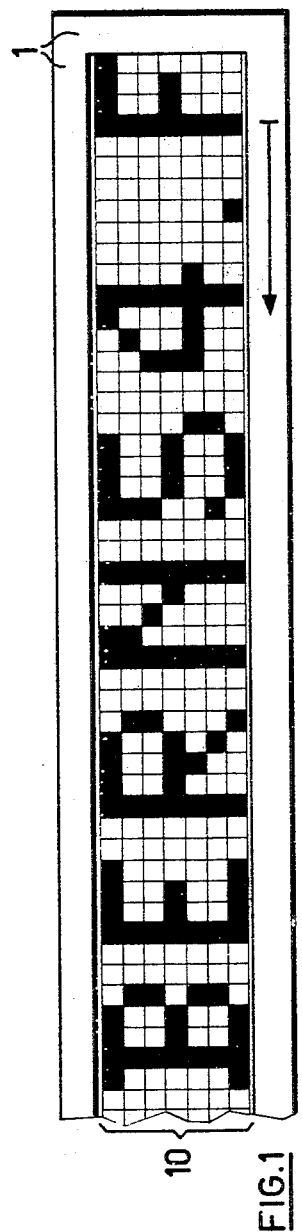
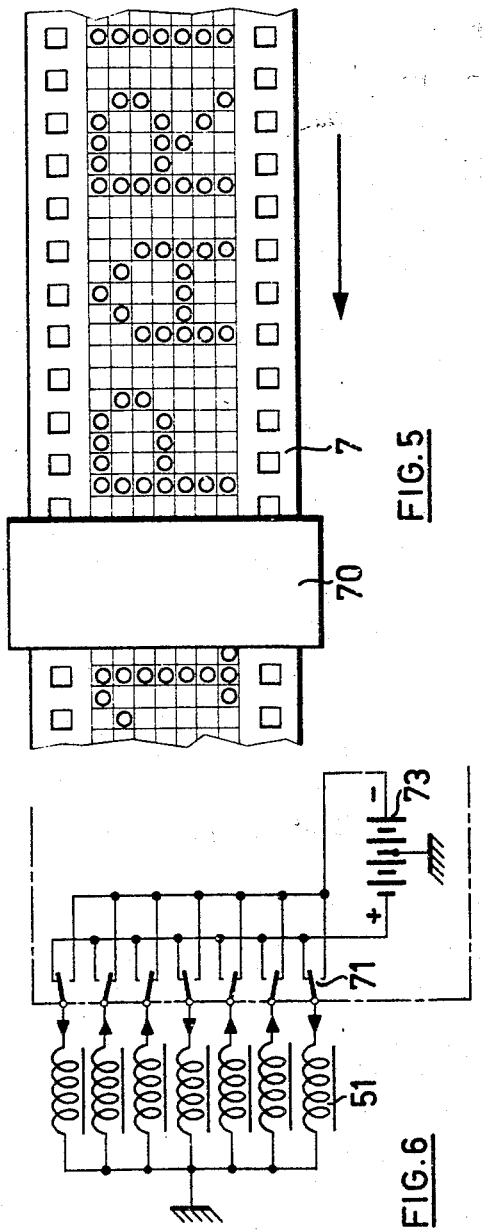
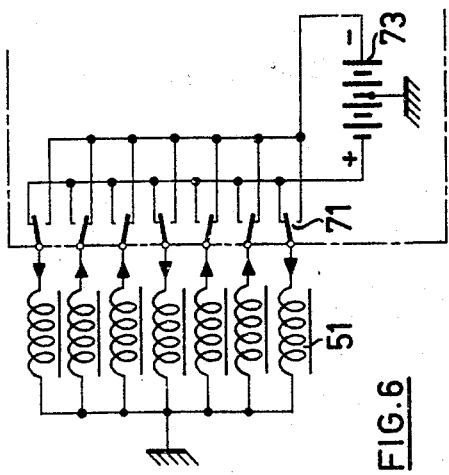
INVENTOR
WERNER MUELLER
BY MICHAEL S. STRIKER
ATTORNEY

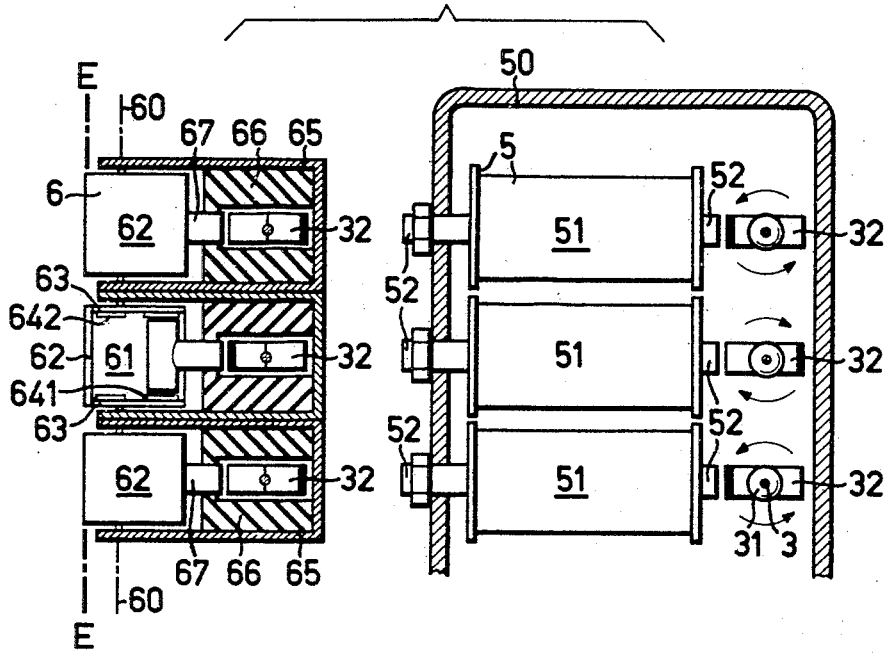
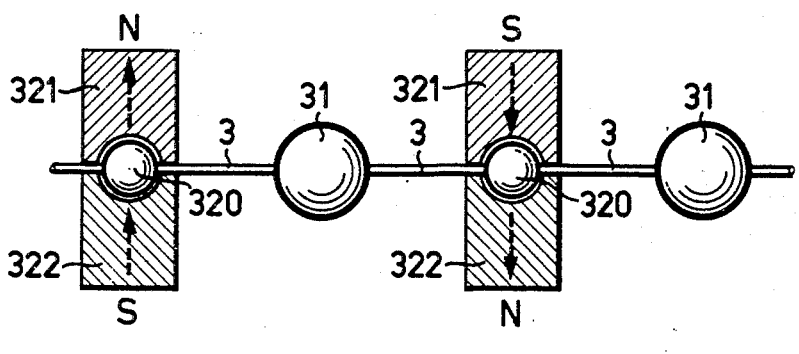

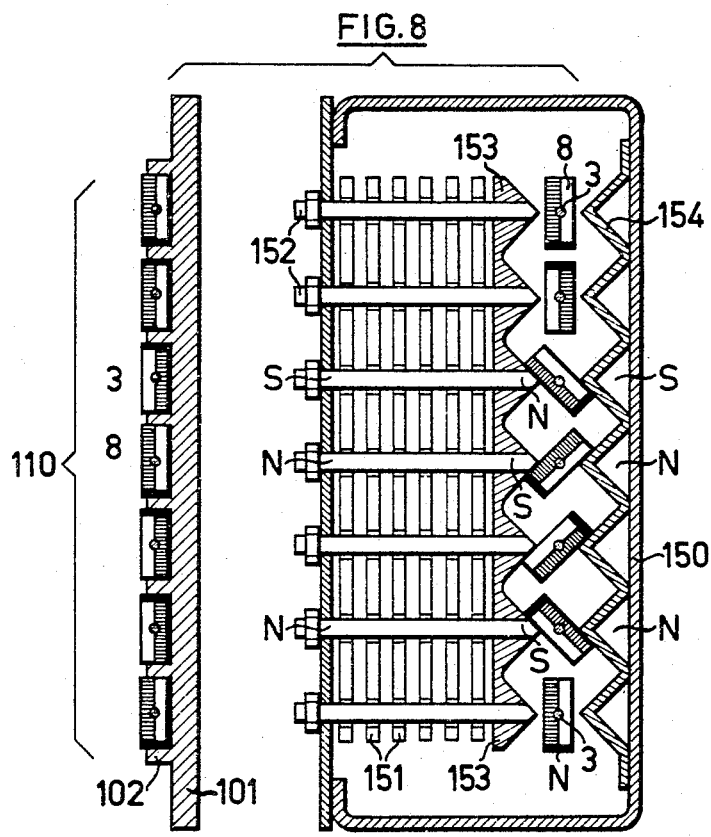
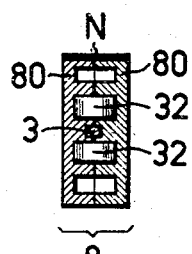
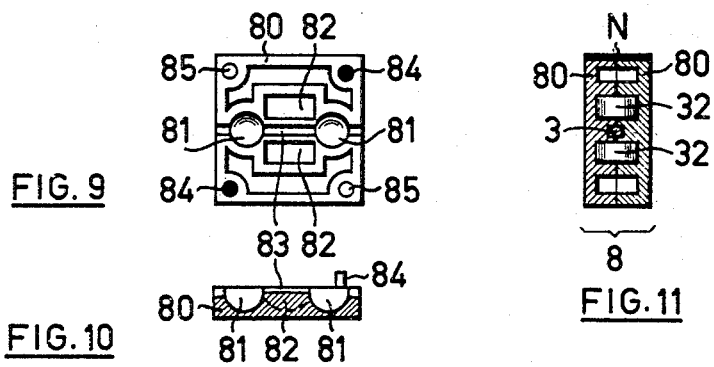

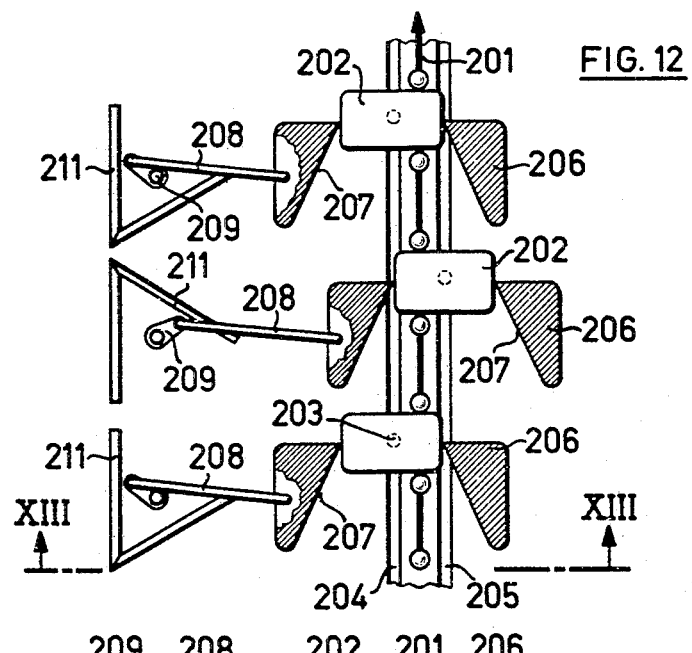
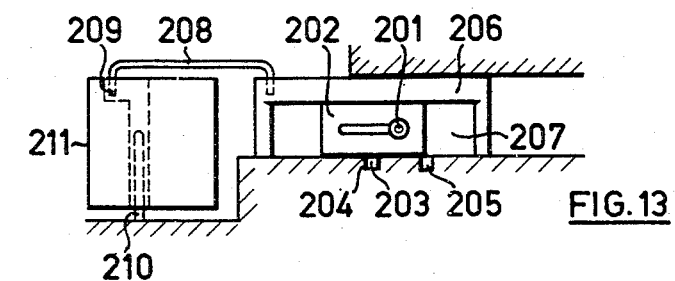
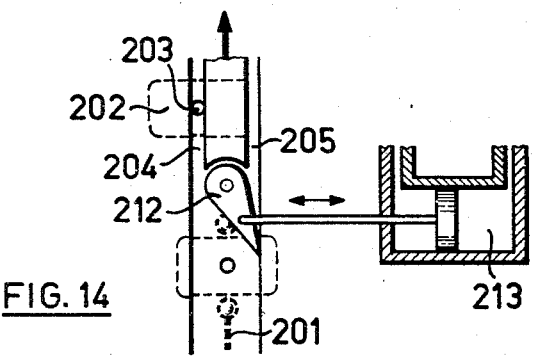

United States Patent Office 3,486,258
Patented Dec. 30, 1969

3,486,258
MOVABLE DISPLAY ARRANGEMENT
Werner Mueller, Aarau, Switzerland, assignor to
Contraves AG, Zurich, Switzerland
Filed Dec. 6, 1967, Ser. No. 693,687
Int. Cl. G09f 11/00
U.S. Cl. 40—28                                15 Claims

ABSTRACT OF THE DISCLOSURE

A display arrangement for displaying preselected combinations of symbols in a moving pattern on a viewing surface subdivided through a plurality of squares. A continuous transport mechanism behind the viewing surface, carries operating elements which have two possible states which are selected and regulated through an orienting device. The movable effect of the display is achieved by the continuous transport mechanism.

BACKGROUND OF THE INVENTION

In the commonly known arrangements for moving script or characters, each subdivided section of the grid field has a light source which is switched on and off. These light sources are, for example, switched through a moving screen or template in rapid succession. In this manner the observer views moving characters or symbols in the form of self-illuminated symbols on a dark background.

For purposes of controlling the lamps, symbolled templates are mounted upon a transport chain which, when moving in the direction of the desired form for the display characters, will actuate sensing elements so as to switch the proper light sources in the grid field. The fabrication and changing of such symbolled templates in very laborious since their size is identical to the size of the symbols being displayed, and the sequence of the symbols or characters to be displayed must be known before hand. Furthermore, the symbolled templates can only be changed with considerable effort and time.

An additional disadvantage of the moving displays known in the art, resides in the condition that the symbols in self-illuminated displays become first visible when it becomes dark. In bright daylight and especially when sunlight prevails, the light source and their background are so brightly illuminated that they cannot provide sufficient contrast in relation to their background so as to be clearly visible, taking into account even the light sensitivity of the human eye.

In accordance with the present invention it is possible to change the reading or wording of the display in any desired manner and in any desired sequence without any substantial delay and without any interruption in operation. The present invention provides for a flexible continuous carrying member behind each line of the grid field and which moves synchronously with all of such similar carriers associated with the other lines of the grid field. The carrying member carries functional elements which are positioned in one of two possible states prior to being transported through the display area. The carrying member moves through the display in the desired direction of the moving symbols or characters. Once the state of the functional element is established it is maintained during the period of time that it is transported across the display area. The functional element, furthermore, exhibits one of two visually contrasting viewing surfaces.

In accordance with the structural principle of the present invention, it is also possible to provide each subdivided area in the grid field with a display element that is built in and which has two possible display states. A continuously moving carrying member behind the display and moving across it, can then actuate these display elements through actuating elements secured through the carrying member. The actuating element can then shift or actuate the display elements so that it displays one or the other of its two visually contrasting services. The individual display elements can as in the commonly-known system, be of individual and switchable lamps. At the same time, however, the disadvantage of self-illuminating symbols is not awarded; only the interchanging of the symbols being displayed is made simpler and more rapid. It is of more advantage, on the other hand, to provide a flap within the subdivided areas of the display field and to illuminate these flaps with separate light sources so as to provide contrasting surfaces, for example, black and white. By means of an actuating element running through the display field, the flap may be turned from one state to the other state as desired.

In another possible embodiment of the present invention, the functional elements on a continuous carrying member are of themselves visual bodies with two visually contrasting states. While moving through the display field, the functional element would be in one of these two possible states. In both principal embodiments it is of advantage to provide the carrying member as a flexible one and upon which the functional elements are mounted through the use of spherical or ball members. The functional elements are in the form of, for example, permanent bar magnets which are mounted so that they are rotatable transverse to the carrying member. For proper orientation of the permanent bar magnets, it is essential that they move through a device having an air space and an orientating magnet which will rotate the permanent bar magnet 180 degrees to obtain contrasting surfaces. The orienting magnet is arranged so that its magnetic flux is directed in accordance with applied signals.

SUMMARY OF THE INVENTION

A display arrangement having a viewing area subdivided into a number of squares to form a grid of lines and columns. Each square is capable of displaying one of two contrasting viewing surfaces. An observer viewing the display can readily distinguish between the two viewing states of each individual square. Behind the viewing surface is a continuous transport mechanism. One such transport mechanism runs along each line of the grid and is arranged in a continuous sprocket chain. Upon the sprocket chain are mounted operating elements which have two possible states. Each of the sprocket chains is driven synchronously with all other sprocket chains moving along the lines of the grid. The operating elements are actuated by an orienting device which sets the operating elements to one of its two posible states. The actuating orienting device is furthermore controlled by a signalling device which transmits signals to the orienting device so as to preset the operating elements to a predetermine dstate and thus display a predetermined visual surface. By arranging the signals so as to provide a predetermined combination of viewing surfaces through the two possible states of the operating elements, it is possible to realize the desired symbolic combination which is moved along the display grid.

The novel features which are considered as characteristic for the invention are set forth in particular in the appended claims. The invention itself, however, both as to its construction and its method of operation, together with additional objects and advantages thereof, will be best understood from the following description of specific embodiments with reference to the accompanying drawing.

BRIEF DESCRIPTION OF THE DRAWING

FIG. 1 is a sectional elevation view of a portion of the grid field;

FIG. 3a and 3b are cross-sectional views taken along the line III—III in FIG. 2;

FIG. 4 is an elevational cross-sectional view of the transport mechanism in one embodiment of the present invention in which permanent bar magnets are rotatably mounted on the transport carrier;

FIG. 5 is a partial view of a punched tape and associated reader as used in the embodiment of FIG. 2;

FIG. 6 is an electrical circuit diagram showing the electromagnetic coils actuated by the punched tape reader of FIG. 5, and their interconnections and energization;

FIG. 8 is a cross-sectional view taken along line VIII—VIII in FIG. 7;

FIG. 9 is a view into the interior of an operating element used in the embodiment of FIGS. 7 and 8 for realizing the viewing surface;

FIG. 10 is a cross-sectional view of the operating element shown in FIG. 9;

FIG. 11 is a cross-sectional view of an operating element according to FIG. 9, and shows the construction in which two permanent bar magnets are retained within the operating elements;

FIG. 12 is a partial plan view of an embodiment, in accordance with the present invention, which is purely of a mechanical structure;

FIG. 13 is a cross-sectional view taken along line XIII—XIII in FIG. 12;

FIG. 14 is a functional schematic view of the information input mechanism used for the embodiments of FIG. 12 and 13.

DESCRIPTION OF THE PREFERRED EMBODIMENTS

Figure 2:
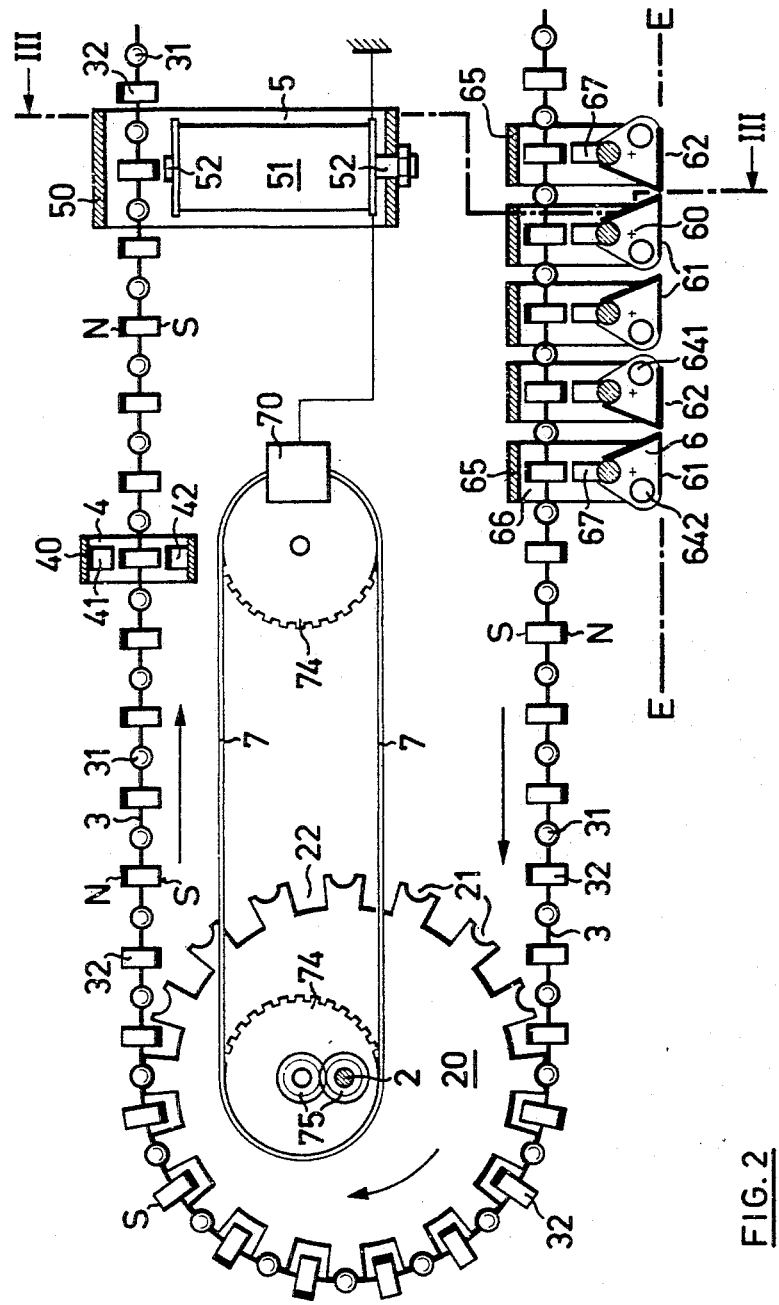
FIG. 2 is a partial cross-sectional view of one embodiment of the present invention and shows the structure for realizing moving symbols along the display field.

Referring to the drawing, FIG. 1 shows a framed grid field or area 10 consisting essentially of uniform square resulting from a subdivision of horizontal rows and vertical columns. Each of the subdivided individual squares can provide one of two indicating states which may be visually differentiated. Thus, an observer may see a display of either black or white surfaces. The black areas in FIG. 1 show a section of text through a summation of all of the squares. The individual symbols or characters appear as a predetermined combination of two possible display states in each of the subdivided squares. It would be equally well to provide white characters of symbols on a dark background. In order to give the observer the impression of moving characters or symbols from right to left through the grid area, it is essential to solve the problem whereby each row in the grid is switched from the first column at the right to the next adjacent column in sequential manner. This moving of each of the rows from column to column, may be accomplished through the application of binary signal states in which the two possible states may be represented by light and dark.

In accordance with the plan view of FIG. 2, a vertical shaft 2 is driven by means of a motor in the direction of the arrow shown, corresponding to a clockwise direction. A sprocket disc 20 is mounted onto the shaft 2. The sprocket disc serves as a transport medium or a continuous flexible carrying medium in the form of a sprocket chain. In accordance with the drawing, this sprocket chain has cords 3 which separate uniformly balls 31 and permanent magnets 32. The disc 20 is provided with semispherical recesses 21 to accommodate the balls 31 on the cord 3. Deeper recesses 22 are provided on the sprocket disc for the purpose of accommodating the permanent ball magnets 32. The second sprocket disc associated with the continuous sprocket chain or cord 3 is not shown as it will not materially aid in the understanding of the invention. For each row in the grid field 10 of FIG. 1, is such an arrangement of two sprocket discs 20 moving a continuous sprocket chain 3. The movements of all sprocket chains must be synchronous in order to realize the desired results. Accordingly, all of the transport sprockets 20 may, for example, be mounted upon the same driving shaft 2 and be driven by the same motor.

The permanent magnets 32 are rotatably mounted upon the cord 3, and while they are free to rotate, they are inhibited from going through axial motions. As shown in FIG. 4, a second ball 320 is situated between the balls 31. Upon the ball 320 are mounted permanent magnets 321 and 322. These magnetic pole pieces have recesses within them to accommodate the ball 320 and they are polarized so that when mounted upon the chain so that the ball 320 fits within the cavity of the pole pieces, a magnet having north and south poles as shown in FIG. 4, is formed. The resulting combination of the pole pieces and the ball 320, produces an arrangement in which the combined permanent magnet is free to rotate about the cord or cable 3, but not to move in an axial direction.

As shown in FIG. 2, situated along the return path of the chain or cable 3 is a reset magnet 4 comprised essentially of a ferromagnetic frame 40 and permanent magnetic pole pieces 41 and 42. As any one of the permanent magnets 32 mounted upon the sprocket chain cable 3, passes through the resetting device 4, the permanent magnet 32 will be oriented in a predetermined and specific direction. A sufficient air gap prevails between the pole pieces 42 and between the permanent magnet 32, so as to permit free passage of the sprocket chain through the device 4. As a result of passing through the resetting device 4, the permanent magnets 32 acquire a predetermined orientation in which, for example, the end marked with the north pole is directed toward the exterior of the sprocket path or track.

After being oriented in this particular and predetermined manner, the permanent magnets 32 enter the air space of a soft iron or ferromagnetic ring of an orienting magnet 5. The latter is comprised of a ferromagnetic frame 50 supporting a coil 51 having a soft iron core 52. As long as the coil has no current within it when the permanent magnet 32 passes through the housing or frame 50, the permanent magnet 32 will retain its orientation imparted to it by the device 4. The same situation will prevail if the current through the coil 51 is in a particular direction. If, on the other hand, the coil 51 carries a DC current which gives the core 52 a polarity so that it does not mate with the direction of the permanent magnet 32 at the instant of time when it passes through the housing 50, the permanent magnet 32 will be rotated through an angle of 180 degrees so that its north pole marked in black will be directed towards the interior of the path of the sprocket chain.

As shown by the arrangement of FIG. 3, all of the orienting magnets 5 are provided with a common ferromagnetic frame 50 for closing the magnetic path. The currents in the upper and lower coils 51 in FIG. 3b, have a direction such that the permanent magnets 32 become rotated whereby the north poles of the magnets 32 face the cores 52 of the coils. The middle coil 51 has no current flowing through it and as a result the permanent magnet 32 associated with this middle coil maintains its orientation that was previously imparted to it. In accordance with this orientation imparted to the magnets 32 by the orienting magnet 5, the ball magnets 32 move into the grid field 10 of FIG. 1. The plane of the grid field 10 is shown in FIG. 2 and 3a by means of the line E—E. Behind this plane of the grid field 10 are snap arrangements or flaps 6 which are rotatable about a vertical axis. These flaps 6 are provided with visually contrasting surfaces as, for example, white 61 and black 62. Furthermore, each flap arrangement is provided with an actuating device located behind it. This actuating device consists essentially of a U-shaped soft iron yoke 65 having synthetic material 66 between its legs. Within this synthetic material is held a T-shaped core element 67 which is also made of ferromagnetic material. Between the terminal surface of the center of each core element 67 and the associated U-shaped yoke 65, is a passage in the synthetic material 66. This passage permits the chain 3 to pass freely with its bar magnets 32. The passage through the synthetic material is designed so as not to permit a change in the orientation of the bar magnets 32.

The flaps 6 are preferably constructed of punched elements of synthetic material. The supporting walls of both of the visually contrasting display surfaces 61 and 62 are located at an angle of 60 degrees with respect to each other. These supporting walls are parallel to the rotatable axis 60 of the flap. The supporting walls are joined together to form a prismatic member, through means of two connecting plates 63 situated transverse to the axis 60. The flap 6 is rotatable within the yoke 65. The connecting plates 63 have mounted within them permanent magnetic discs 641 and 642. These magnetic discs are separated from each other by an angle of approximately 120 degrees. The magnetic discs are located parallel to the axis of rotation and are of opposite polarity with respect to each other. When a permanent magnet 32 passes through the yoke 65, a magnetic field is established within the space between the core elements 67 and the terminal surface of the yoke 65, which acts upon the flap 6 in a manner depending upon the orientation of the permanent magnet 32. Thus, depending upon the polarization of the permanent magnetic discs 641 and 642, and the orientation of the permanent magnet 32, the flap 6 will be acted upon such that when the magnetic field is in one direction, one of the magnetic discs will be attracted into the paths of the magnetic field whereas in another case, the magnetic disc will be repelled from the air gap through which the magnetic field passes. As a result the flap 6 is rotatably moved between its two possible positions. Thus, depending upon the orientation of the permanent bar magnet 32, the flap 6 will be actuated so as to display either the viewing surface 61 or the surface 62, and thereby provide the desired indication.

In accordance with the arrangement of FIGS. 2 to 6, the predetermined orientation of the bar magnets 32 is accomplished through the orienting magnets 5 which, in turn, are directed through the action of a punched tape 7. Upon this tape 7 is recorded, in coded form, the character or symbol information which is read out by a reading apparatus 70 as the tape passes by it. The reading apparatus 70 reads the information on tape 7, punched in the form of coded holes, and actuates accordingly switches 71. The switches 71 have binary states and thus their positions may be made to correspond precisely to the coded information on the tape 7.

The reading apparatus 70 reads in sequence column after column on the moving tape 7, and through the means of switches 71, causes the associated coils 51 to conduct current in either one or the opposite directions depending on the state of the switches 71 leading to the respective coil. Therefore, depending upon the polarity of the coil 51 resulting from a particular direction of current flowing through it as taken from a D.C. supply 73, the permanent magnet 32 will be oriented in one or other of its two possible directions. For purposes of simplicity, FIG. 2 shows two gears 74 upon which the continuous punched tape 7 runs. One of the gears is driven by a geared driving linkage 75 through the shaft 2 upon which all sprockets 20 are mounted. A punched tape can also be operated in conjunction with a suitable keyboard recording machine. One such machine is used in conjunction with a decoding arrangement, and continuously changing text may appear within the grid field 10 of FIG. 1. During the periods of time in which the punched tape remains stagnant and during which no information is recorded on it, the sprocket discs 20 may also be held stationery, in which case the display in the grid field is at standstill.

Figure 7:
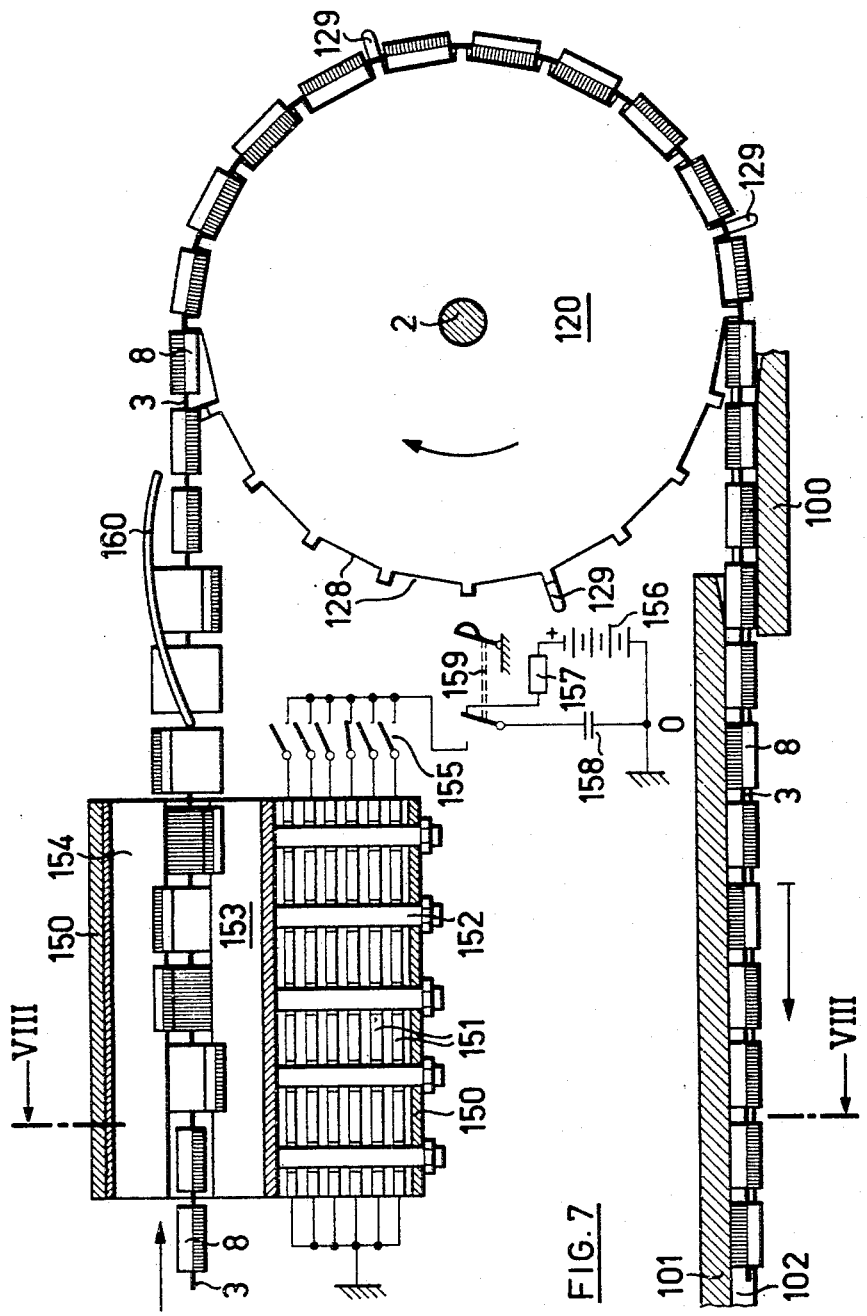
FIG. 7 is a cross-sectional partial view of the structure of another embodiment of the present invention.

FIGS. 7 and 8 show a particular advantageous embodiment of the present invention, in which the elements in the continuous conveying carrier are themselves made of rotatable displays. These plate-shaped visual displays are of two visually contrasting surfaces comprised, for example, of black and white. The displays retain their designated indicating states within the grid field until they have passed the grid border 101. The indicating plates or discs are constructed preferably as shown in FIGS. 9 to 11. From the construction shown therein, they are comprised of two congruent but differently colored punched elements 80 having two recesses or cavities 81 for a ball 31 upon a cord or cable 3 and two adjacent recesses 82. A channel 83 is provided for the passage of the cord or cable 3. Holes 4, bolts 84 and guide holes 85 are further provided. Both shell halves 80 surround the permanent magnet 32 on the cable 3 as shown in FIG. 11.

In accordance with FIGS. 7 and 8, the disc-shaped indicating members 8 mounted upon the cable 3, move in each row in the direction of the arrow from right to left in the grid field. On the return side of the cable 3 the motion is in the opposite direction. The transport medium may be in the form of sprockets 120 secured to a shaft 2. These sprockets have recesses 128 which receive the indicating discs or plates 8. The grid field is constructed of a display board 101 which is covered on one side with the plates 100. The display board 101 has ribs 102 formed parallel to each other and to the direction of motion indicated by the arrow. These ribs serve as guides for the indicating discs or plates 8. Thus, the ribs ascertain that the indicating plates 8 do not become moved or rotated out of their desired positions inadvertently. In FIG. 8 the north pole of the bar magnet 32 within the indicating discs is marked in black, whereas the side surfaces in FIGS. 7 and 8 are cross-hatched. In this manner it is possible to recognize easily the orientation of these indicating members. From FIGS. 7 and 8 it may be seen that the indicating members 8 pass through a setting arrangement 150 before they re-enter the grid area. This setting apparatus 150 is comprised of five columns and seven rows of electromagnets. With these electromagnets it is possible to realize a 5 x 7 grid arrangement for an entire symbol and to set the indicating discs 8 accordingly.

The soft iron frame 150 serves as a return path for the magnetic flux of all electromagnets. Five columns of soft iron rods or cords 152 are mounted within this setting device, and these cores 152 terminate in roof-shaped pole pieces 153. The peak edges of these pole pieces run parallel to the direction of motion of the sprocket chain 3 and lie in the plane of movement. Symmetrical with respect to the common vertical plane of the sprocket chain, similar pole pieces 154 are arranged on the inner side of the frame 150. The distance between oppositely lying peak edges of the pole pieces 153 and 154, are somewhat larger than the thickness of the indicating plates 8. At the same time these distances are somewhat shorter than the total length of the bar magnets 32 embedded in the plates 8. As long as no magnetic field prevails in the air space between respective electromagnets, the position of the indicating members moving within the air gap remains unaltered. This is shown by the upper and lower indicating member in FIG. 8. If, however, a magnetic field is provided between the pole pieces 153 and 154, the indicating discs are rotated in a predetermined manner to a position corresponding to the polarity of magnetization. When the indicating members then leave the setting frame 150, they become further positioned to their final indicating position by means of the screw-shaped guide element 160 which turns the indicating members through an angle of 45 degrees or an angle of 135 degrees depending on the prevailing magnetic polarity. From the group of cores 152 are a plurality of controlled plates 151 each containing an excitation coil. The excitation coils for each of the controlled plates 151 are connected in series, whereas the direction of winding of the coils correspond to the particular code desired, and which is designated to the control plates 151.

In accordance with FIG. 7, each control plate 151 is connected to the particular switching element. The device 150 for example, may be in the form of an electric typewriter machine. When a particular key is depressed, a predetermined D.C. circuit is established. A battery 156 then charges a capacitor 158 through a resistor 157 in a normal manner. This charging process takes place until an element 129 mounted on the transport disc 120 actuates a switch 159 through a spring-loaded lever. Once the switch 159 is actuated the capacitor 158 can discharge through the excitation coils within the control plates 151. All of the indicating plates 8 connected into the circuit are thereby rotated to a predetermined position by the setting arrangement 50. The guide element 160 then serves to rotate further the indicating members 8 so as to be in the desired combination of positions. Instead of actuating a group of plurality of elements in unison, it is, of course, also possible to actuate single columns in the above-described manner.

The embodiment shown in FIGS. 12 to 14 includes no electrical or electromagnetic parts. It is comprised only of mechanical members.

In this embodiment a continuous sprocket chain 201 contains guide members 202 which are movable transverse to the sprocket chain. These run parallel to guide notches 204 and 205 provided for a base rib 203 for each guide member 202. These can run in either one or the other of two guide notches.

Every square in the grid surface has associated with it a flat member 211 similar to that for the arrangement of FIGS. 2 and 3. These flat members have display surfaces which are optically different and which are displaced from each other by an angle of 60 degrees parallel to the axis of rotation 210. These flat members are connected to a slide member 206 through means of the linkage 208–209. These slide members 206 run one after another through the guide members 202, and in accordance with the positioning of these to one or the other side. This accomplished through the cooperation of the inner surface 207 of the slide members and the side end of the guide members 202. The arrangement is such that the flat member 211 becomes rotated to a position corresponding to the orientation of the guide member which has passed through last. In the positioning arrangement shown in FIG. 14, a tongue 212 operates in conjunction with a double stroke pneumatic cylinder 213. Depending on the controlled signals transmitted, the cylinder moves either to the left or to the right and, as a result the guide ribs 203, are brought into one or the other guide notches 204 and 205.

In a similar manner, it is also possible to replace the guide members 202 with flaps having two visually contrasting display surfaces. These flaps then move through the entire grid field in the designated position, and display squares which are themselves movable in accordance with the principle of FIGS. 7 and 8.

It will be understood that each of the elements described above, or two or more together, may also find a useful application in other types of movable display differing from the types described above.

While the invention has been illustrated and described as embodied in a movable display, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the claims.

What is claimed as new and desired to be secured by Letters Patent is set forth in the appended claims.

I claim:

1. A display arrangement comprising, in combination, a display member having a viewing surface subdivided into a plurality of display sections forming lines and columns of a grid; continuous transport means associated with each line of said grid and movable along said line behind said viewing surface, each of said transport means moving synchronously with all other transport means; operating elements have two visually contrasting surfaces and mounted on said transport means for transportation along said lines of said grid; actuating means for actuating said operating elements and setting said operating elements to a predetermined visual surface; and controlling means for controlling said actuating means whereby said actuating means sets said operating elements so as to display a combination of contrasting viewing surfaces to constitute a predetermined symbolic combination.

2. The display arrangement as defined in claim 1 including an indicating member mounted within each display section of said display member and having two visually contrasting indicating states, said continuous transport means setting said indicating member to a predetermined one of said two possible indicating states of said indicating member.

3. A display arrangement as defined in claim 1, wherein said viewing surface is transparent for viewing said visually contrasting surfaces on said operating elements therethrough.

4. The display arrangement as defined in claim 1 including permanent magnetic means secured to said operating elements and rotatable transverse to the line of motion of said continuous transport means; and orienting magnetic means for rotating and orienting said permanent magnetic means to a predetermined rotational position corresponding to a predetermined position of said operating element for displaying the desired one of said two visually contrasting surfaces.

5. The display arrangement as defined in claim 2 including illuminating means for illuminating said indicating member.

6. The display arrangement as defined in claim 5 wherein said indicating member is a flap rotatable through an angle of 60 degrees and having two viewing surfaces situated at an angle of 60 degrees with respect to each other and being parallel to the axis of rotation of said flap.

7. The display arrangement as defined in claim 6, including magnetic means mounted within said flap;. and actuating permanent magnetic means mounted on said continuous transport means for actuating said flap through the interaction of the magnetic fields associated with said magnetic means within said flap and said actuating magnetic means on said continuous transport means, said actuating magnetic means on said continuous transport means being oriented so as to rotate said flap to a predetermined position and thereby display a predetermined viewing surface.

8. The display arrangement as defined in claim 4 wherein said operating elements are in the form of rectangular planar elements enclosing said permanent magnetic means.

9. The display arrangement as defined in claim 8 wherein said orienting magnetic means comprises triangular roof-shaped magnetic elements having an air gap between peak edges of said roof-shaped elements substantially as large as the thickness of said rectangular planar elements for orienting said planar rectangular elements to a predetermined angular position for displaying the desired viewing surface.

10. The display arrangement as defined in claim 9 including a screw-shaped member located outside of said orienting magnetic means and deflecting further said rectangular planar elements so as to be located accurately in a predetermined position.

11. The display arrangement as defined in claim 10 wherein said rectangular planar elements are made of punched synthetic material embedding said permanent magnetic means.

12. The display arrangement as defined in claim 1 including taped information storage means for storing combinations of symbols to be displayed on said display arrangement; reading means for reading the information stored on said taped storage means; and signal converting means for converting the information read by said reading means into signals suitable for application to said controlling means whereby the symbols being displayed are selectively changeable.

13. The display arrangement as defined in claim 4 wherein said orienting magnetic means comprises a plurality of sets of electromagnetic coils, one set of both coils being associated with one operating element, predetermined coils within said sets being connected in series for deflecting said operating elements in a predetermined pattern.

14. The display arrangement as defined in claim 13 including switching means for selectively connecting predetermined coils of said sets in series; and energizing means for energizing said coils with the electrical current whereby said coils generate magnetic fields in a predetermined pattern of predetermined polarity.

15. The display arrangement as defined in claim 1 including spherical means secured to said continuous transport means and surrounded by said operating elements whereby the latter are rotatable transversely about said continuous transport means.

References Cited

UNITED STATES PATENTS 3,140,553  7/1964  Taylor.
3,199,098  8/1965  Schwartz.
3,365,824  1/1968  Winrow.

FOREIGN PATENTS 24,108  10/1913  Great Britain.

EUGENE R. CAPOZIO, Primary Examiner
W. J. CONTRERAS, Assistant Examiner

U.S. Cl. X.R.

40—52